US012347467B2

(12) United States Patent
Poss et al.

(10) Patent No.: US 12,347,467 B2
(45) Date of Patent: Jul. 1, 2025

(54) DC AND SYNCHRONIZED ENERGY ASSISTED PERPENDICULAR MAGNETIC RECORDING (EPMR) DRIVER CIRCUIT FOR HARD DISK DRIVE (HDD)

(71) Applicant: Western Digital Technologies, Inc., San Jose, CA (US)

(72) Inventors: Joey M. Poss, Rochester, MN (US); Yunfei Ding, Fremont, CA (US); John T. Contreras, Palo Alto, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 43 days.

(21) Appl. No.: 18/467,045

(22) Filed: Sep. 14, 2023

(65) Prior Publication Data
US 2024/0105217 A1  Mar. 28, 2024

Related U.S. Application Data (60) Provisional application No. 63/409,059, filed on Sep. 22, 2022.

(51) Int. Cl.
*G11B 5/02* (2006.01)
(52) U.S. Cl.
CPC ..................... *G11B 5/02* (2013.01)
(58) Field of Classification Search
CPC .... G11B 5/02; G11B 2005/0024; G11B 5/012
See application file for complete search history.

(56) References Cited

U.S. PATENT DOCUMENTS

| | | | |
|---|---|---|---|
| 8,134,792 | B2 | 3/2012 | Ranmuthu |
| 8,873,188 | B2 | 10/2014 | Livshitz et al. |
| 8,929,013 | B1 | 1/2015 | Mastrocola et al. |
| 9,030,770 | B2 | 5/2015 | Contreras et al. |
| 9,111,561 | B1 | 8/2015 | Contreras et al. |
| 9,129,635 | B2 | 9/2015 | Fukuda et al. |
| 9,672,846 | B1 | 6/2017 | Tanaka et al. |
| 9,881,637 | B1 | 1/2018 | Wilson et al. |
| 11,295,764 | B1 | 4/2022 | Goode et al. |
| 2015/0043106 | A1 | 2/2015 | Yamada et al. |
| 2022/0246173 | A1* | 8/2022 | Guo .................. G11B 5/02 |

FOREIGN PATENT DOCUMENTS

| | | |
|---|---|---|
| CN | 103187071 B | 12/2017 |
| JP | H03127303 A | 5/1991 |

OTHER PUBLICATIONS

Contreras et al., "Characterization of Write-Signal Efficiency Utilizing Write-Current Dynamic Wave-Shaping", IEEE Transactions on Magnetics, Feb. 2017, p. 7, vol. 53, No. 2.

* cited by examiner

*Primary Examiner* — Andrew Sasinowski
(74) *Attorney, Agent, or Firm* — NOD Law PC (57) ABSTRACT

Various illustrative aspects are directed to a data storage device comprising a storage medium and a head configured to access the storage medium. The head comprises a first write assist element and a second write assist element. Control circuitry for driving the head is configured to apply a first write assist current Im that is synchronized to a write data current Iw to the first write assist element; and to apply a second DC write assist current Imdc to the second write assist element.

22 Claims, 10 Drawing Sheets

DC AND SYNCHRONIZED ENERGY ASSISTED PERPENDICULAR MAGNETIC RECORDING (EPMR) DRIVER CIRCUIT FOR HARD DISK DRIVE (HDD)

CLAIM OF PRIORITY UNDER 35 U.S.C. § 120

The present application for patent claims priority to Provisional Application No. 63/409,059 entitled "DC AND SYNCHRONIZED ENERGY ASSISTED PERPENDICULAR MAGNETIC RECORDING (EPMR) DRIVER CIRCUIT FOR HARD DISK DRIVE (HDD)" filed Sep. 22, 2022, and assigned to the assignee hereof and hereby expressly incorporated by reference herein.

BACKGROUND

Data storage devices such as hard disk drives (HDDs) comprise a disk and a head connected to a distal end of an actuator arm that is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) that is read by the head and processed by a servo control system to control the actuator arm as it seeks from track to track.

Data is typically written to the disk by modulating a write current in an inductive coil (write coil) to record magnetic transitions onto the disk surface in a process referred to as saturation recording. During read-back, the magnetic transitions are sensed by a read element (e.g., a magneto-resistive element) and the resulting read signal is demodulated by a suitable read channel. In conventional perpendicular magnetic recording (PMR), an electrical current is passed through the write coil, which generates a magnetic field. This field magnetizes a write pole, which is in close proximity to the disk surface. The magnetic field from the write pole then aligns the magnetic grains in the disk media in a certain orientation, creating a stored bit.

Since data on an HDD is written on tracks, higher tracks per inch (TPI) and higher bits per inch (BPI) on those tracks result in higher areal density, which enables more data per disk. Energy assisted magnetic recording (EAMR), which involves focusing energy on the track being written to in order to make the disk media easier to write to, is one approach for increasing aerial density. One type of EAMR is heat assisted magnetic recording (HAMR), which heats the disk surface during write operations to decrease the coercivity of the magnetic medium, thereby enabling the magnetic field generated by the write coil to magnetize the disk surface more readily. Another type of EAMR is microwave assisted magnetic recording (MAMR), which uses a spin torque oscillator (STO) to apply a high frequency auxiliary magnetic field to the media close to the resonant frequency of the magnetic grains, thereby enabling the magnetic field generated by the write coil to magnetize the disk surface more readily.

SUMMARY

Various aspects of this disclosure provide a DC and synchronized energy assisted perpendicular magnetic recording (ePMR) driver circuit for a hard disk drive (HDD).

One aspect of this disclosure is directed to a data storage device comprising a storage medium; a head configured to access the storage medium, the head comprising a first write assist element and a second write assist element; and control circuitry for driving the head, the control circuitry configured to apply a first write assist current Im that is synchronized to a write data current Iw to the first write assist element; and apply a second DC write assist current Imdc to the second write assist element.

Another aspect of this disclosure is directed to control circuitry, which may comprise one or more processing devices, for driving a head of a data storage device that comprises an inductive write assist element and a resistive write assist element. The control circuitry comprises means for applying a first write assist current Im that is synchronized to a write data current Iw to the inductive write assist element; and means for applying a second DC write assist current Imdc to the resistive write assist element.

A further aspect of this disclosure is directed to a method for driving a head of a data storage device. The method comprises applying a write assist current Im that is synchronized to a write data current Iw to an FEePMR write assist element during a write operation; and applying a DC write assist current Imdc to an ePMR write assist element during the write operation.

In some implementations of the data storage device, control circuitry and/or the method described herein, the first write assist element is a field effect energy assisted perpendicular magnetic recording (FEePMR) write assist element; and the second write assist element is an energy assisted perpendicular magnetic recording (ePMR) write assist element.

In some implementations of the data storage device, control circuitry and/or the method described herein, the first write assist element has an inductance Lm and the second write assist element has a resistance Rm.

In some implementations of the data storage device, control circuitry and/or the method described herein, the control circuitry comprises first and second current sources that generate toggled currents I_p and I_n that are timed relative to the write data current Iw. The first and second current sources are coupled to the first write assist element to generate the first write assist current Im that is synchronized with the write data current Iw.

In some implementations of the data storage device, control circuitry and/or the method described herein, the control circuitry comprises a first voltage source Vm that is coupled to the second write assist element to generate the second DC write assist current Imdc.

In some implementations of the data storage device, control circuitry and/or the method described herein, the control circuitry comprises a dynamic wave shaping (DWS) element that programs an overshoot pulse amplitude and an overshoot pulse duration of the first write assist current Im.

In some implementations of the data storage device, control circuitry and/or the method described herein, the control circuitry comprises a variable delay element that programs a delay of the first write assist current Im relative to the write data current Iw.

In some implementations of the data storage device, control circuitry and/or the method described herein, the control circuitry comprises a variable capacitance Cx across the first write assist element that sets a rise/fall time of the first write assist current Im.

Additional aspects of this disclosure are depicted and described in the accompanying drawings and the following description.

BRIEF DESCRIPTION OF THE DRAWINGS

Various features and advantages of this disclosure will be apparent from the following description and accompanying drawings. The drawings are not necessarily to scale; emphasis instead is placed on illustrating the principles of this disclosure. In the drawings, like reference characters may refer to the same parts throughout the different views. The drawings depict only illustrative examples of this disclosure and are not limiting in scope.

DETAILED DESCRIPTION

Figure 1A:
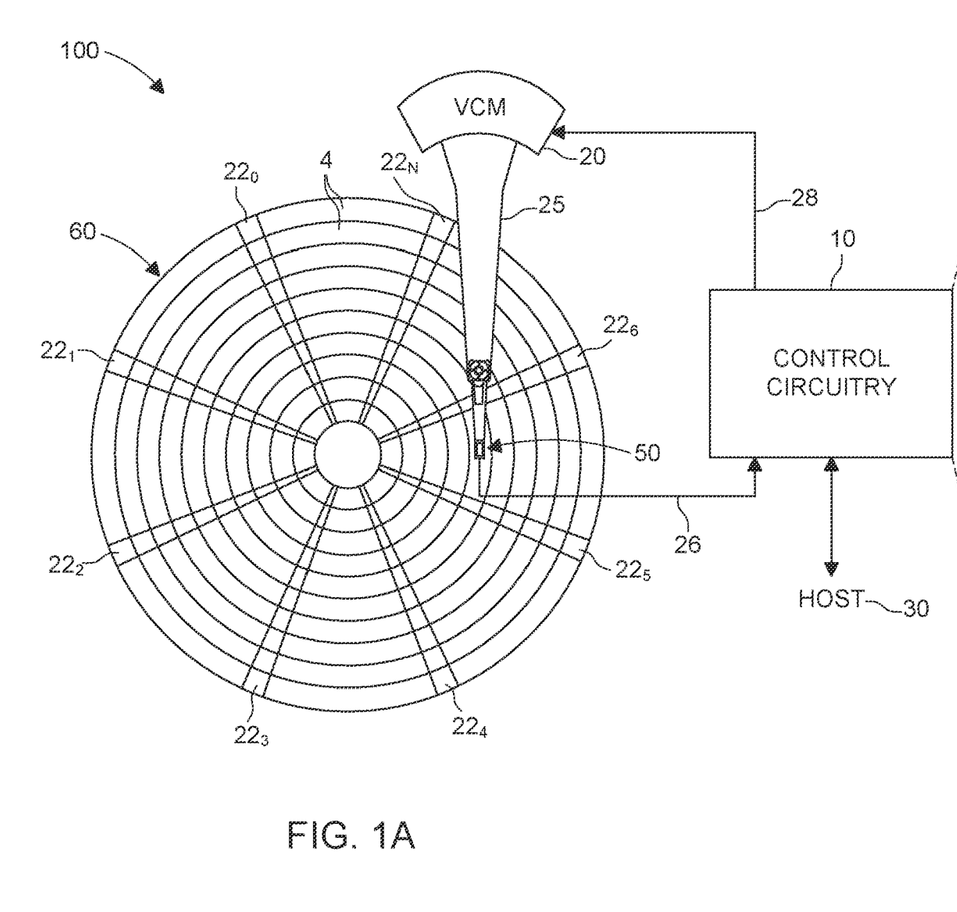
FIG. 1A is a conceptual block diagram of a data storage device in the form of a hard disk drive (HDD), in accordance with aspects of this disclosure.

FIG. 1A is a conceptual block diagram of a data storage device in the form of hard disk drive (HDD) 100, in accordance with aspects of this disclosure. HDD 100 comprises a storage medium in the form of disk 60 and a magnetic read-write head 50. Disk 60 comprises a plurality of radially spaced data tracks 4 that may be divided into a plurality of circumferentially spaced data sectors (not shown) for storing user data and/or other information. Disk 60 also comprises a plurality of angularly spaced servo wedges 22$_0$-22$_N$ that include a servo sector for each data track 4 providing embedded servo information for the track.

The servo information for each track 4 may include a pattern of alternating magnetic transitions (servo burst), which may be read from disk 60 by head 50 and processed by controller 10 to determine the position of head 50 relative to the corresponding track 4.

Magnetic read-write head 50 is connected to the distal end of actuator arm 25 to access the surface of disk 60. Head 50 includes a write element for writing data to disk 60 and a read element for reading data from disk 60. Actuator arm 25 is rotated about a pivot by an actuator such as voice coil motor (VCM) 20 to position head 50 radially over disk 60. To write data to disk 60, control circuitry 10 controls VCM 20 to position head 50 over a desired track 4. Control circuitry 10 processes data to be written to disk 60 into a data write current, which is outputted to head 50. Head 50 converts the write signal into a magnetic field that magnetizes the surface of disk 60, thereby magnetically writing the data onto disk 60. To read data from disk 60, control circuitry 10 controls VCM 20 to position head 50 over a desired track 4. Head 50 generates a read signal based on the magnetization of the disk surface under head 50. Control circuitry 10 receives and processes the read signal into data. HDD 100 also includes a spindle and a spindle motor (not shown) for rotating disk 60 at high speed during read/write operations such that an air bearing forms between head 50 and the surface of disk 60.

Host 30 may be a computing device such as a desktop computer, a laptop, a server, a mobile computing device (e.g., smartphone, tablet, Netbook, to name a few non-limiting examples), or any other applicable computing device. Alternatively, host 25 may be a test computer that performs calibration and testing functions as part of the disk drive manufacturing processing.

Figure 1B:
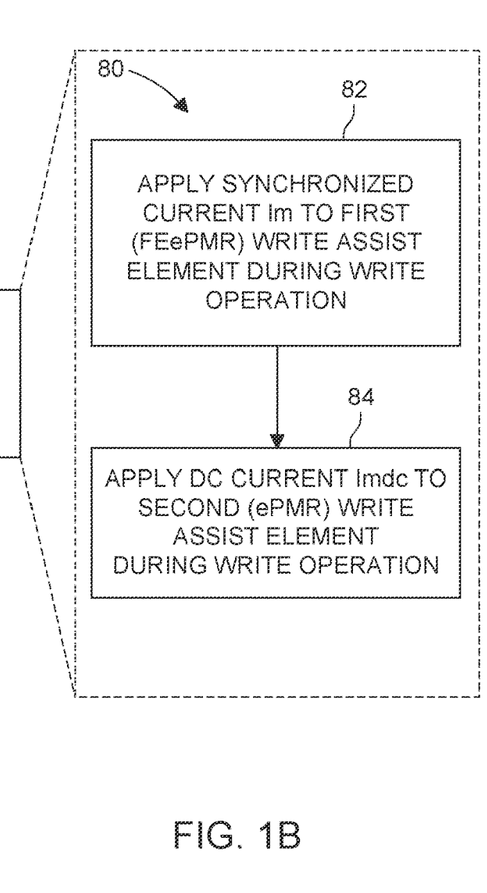
FIG. 1B is a flowchart of a method that the control circuitry of the HDD of FIG. 1A may execute, in accordance with aspects of this disclosure.

Control circuitry 10 controls HDD 100 is configured to perform various operations described herein. In one aspect of this disclosure, control circuitry 10 is configured to execute the method 80 shown in the flow diagram of FIG. 1B. In particular, and as will be described in more detail herein, in step 82, a synchronized write assist current Im is applied to a first (e.g., FEePMR) write assist element during a write operation. In step 84, a DC write assist current Imdc is applied to a second (e.g., ePMR) write assist element during the write operation. In additional aspects of this disclosure, in connection with method 80, control circuitry 10 may execute method 750 of FIG. 7 for programming various parameters of the synchronized and DC write assist currents.

Energy assisted magnetic recording (EAMR), which involves focusing energy on the track being written to make the disk media easier to write to, is one approach for increasing aerial density. One type of EAMR is heat assisted magnetic recording (HAMR), which heats the disk surface during write operations to decrease the coercivity of the magnetic medium, thereby enabling the magnetic field generated by the write coil to magnetize the disk surface more readily. Another type of EAMR is microwave assisted magnetic recording (MAMR), which uses a spin torque oscillator (STO) to apply a high frequency auxiliary magnetic field to the media close to the resonant frequency of the magnetic grains, thereby enabling the magnetic field generated by the write coil to magnetize the disk surface more readily.

According to aspects of this disclosure, another type of energy assisted magnetic recording (EAMR) is energy assisted perpendicular magnetic recording (ePMR), which introduces an improvement in head transition consistency that reduces jitter and enables an increase in BPI. Jitter comes from the volatility of saturation at the recording head when flipping the write current from one direction to another and is a significant limiter for improving BPI. ePMR applies an electrical bias current to an assist element in the recording head (e.g., near the main pole of the write head) during at least a portion of the write operation. This current generates an additional magnetic field that creates a preferred path for the magnetization flip of media bits. By applying a preferred magnetic path, every pass of multiple data writes has a more consistent waveform. This, in turn, produces a more consistent write signal, significantly reducing jitter. When jitter is reduced, bits of data can be written closer together, which increases BPI and leads to higher aerial density. An example ePMR assist element and its related material stack and design is described in co-owned U.S. Pat. No. 10,891,974 granted Jan. 12, 2021, titled "Magnetic head with current assisted magnetic recording and method of making thereof" which is hereby incorporated by reference.

Figure 2:
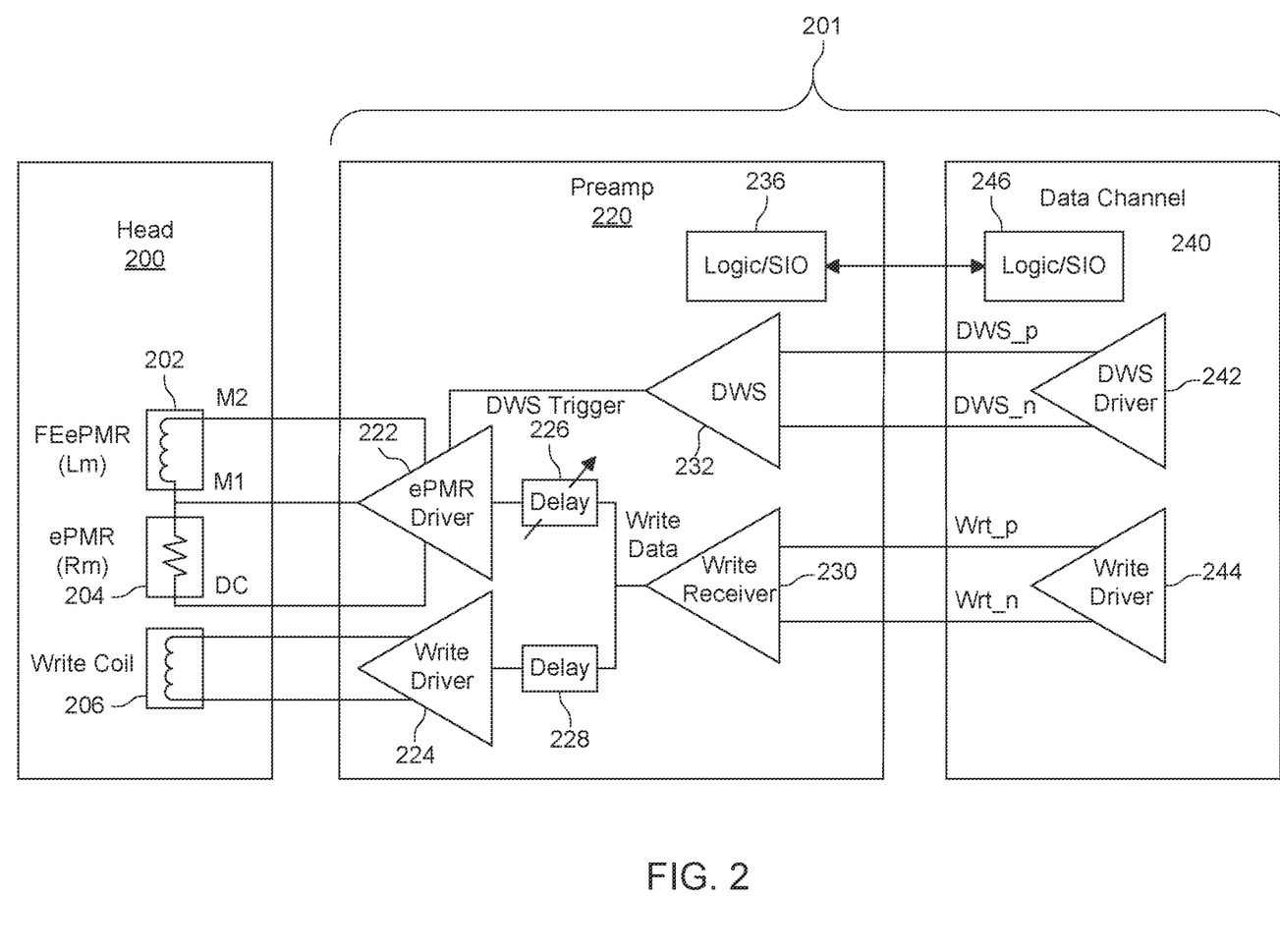
FIG. 2 is a conceptual block diagram of an ePMR head and control circuitry for the head, including a preamp and a data channel, in accordance with aspects of this disclosure.

According to aspects of this disclosure, a driver for a write head utilizing ePMR is provided that enhances write-ability and reduces write jitter. The driver synchronizes the ePMR current with the head write current to properly drive the head. FIG. 2 is a conceptual block diagram of a head 200 utilizing ePMR write assist elements and control circuitry 201 to drive head 200. Control circuitry 201 includes preamp 220 coupled to head 200, and data channel 240 coupled to preamp 200. Control circuitry 201 may be a part of control circuitry 10 of FIG. 1A or may be separate from control circuitry 10.

Head 200 comprises a first write assist element 202 coupled in series with a second write assist element 204. In one implementation, first write assist element 202 is a field effect ePMR (FEePMR) element, having an inductance Lm, and second write assist element 204 is an ePMR element, having a resistance Rm. The FEePMR element is so-labeled field effect ePMR as it is an assist element that provides an assistive effect to the primary write field generated by the write pole or main pole driven by the write coil 206. The FEePMR element implementation can include several options, including a conductive element or material stack near the write pole (e.g., between the write pole and a surrounding shield or structure), a magnetic assistive write element such as an assistive pole, etc. A first write assist current Im that is synchronized with the write data current Iw is driven in first write assist element 202, and a second, DC write assist current Imdc is driven in second write assist element 204. As will be described in more detail, the ePMR portion of head 200 is driven by signals on three terminals DC, M1 and M2 from preamp 220. Head 200 further comprises write coil 206, which is an inductive coil that writes data by selectively magnetizing portions of the magnetic material on the surface of disk 60. Magnetic transitions representing bits are written into the magnetic material by reversing the current through write coil 206. As implemented in a disk drive, head 200 may correspond to head 50 of FIG. 1A.

Preamp 220 comprises ePMR driver circuit 222, which drives FEePMR write assist element 202 and ePMR write assist element 204 of head 200 via signals on terminals DC, M1 and M2. Additional details of driver circuit 222 will be described with reference to FIGS. 3 and 8. Preamp 220 further comprises write driver 224, which generates an analog signal, current Iw, that is applied to the inductive write coil 206 of head 200. Driver circuit 222 is driven by the write data output of write receiver 230, as delayed by programmable delay element 226. Write driver 224 is driven by the write data output of write receiver 230, as delayed by delay element 228. As will be described in more detail herein, programmable delay element 226 provides the ability to program and modify the timing of synchronized write assist current Im relative to the timing of write data current Iw.

In some embodiments, the head 200 includes one assist element. For example, an implementation of head 200 may only include the first assist element FEePMR 202 and not the second assist element ePMR 204. Correspondingly, the ePMR driver circuit would not need to drive the DC write assist current and would provide the synchronized write assist current. In other embodiments, the head 200 can include other types of assist elements (other than FEePMR) that can be driven with the synchronized write assist current. Similarly, the head 200 can include other types of assist elements (other than ePMR) that can be driven with the DC write assist current. Thus preamp 220 can be generally used for driving various types of assist elements.

Figure 5:
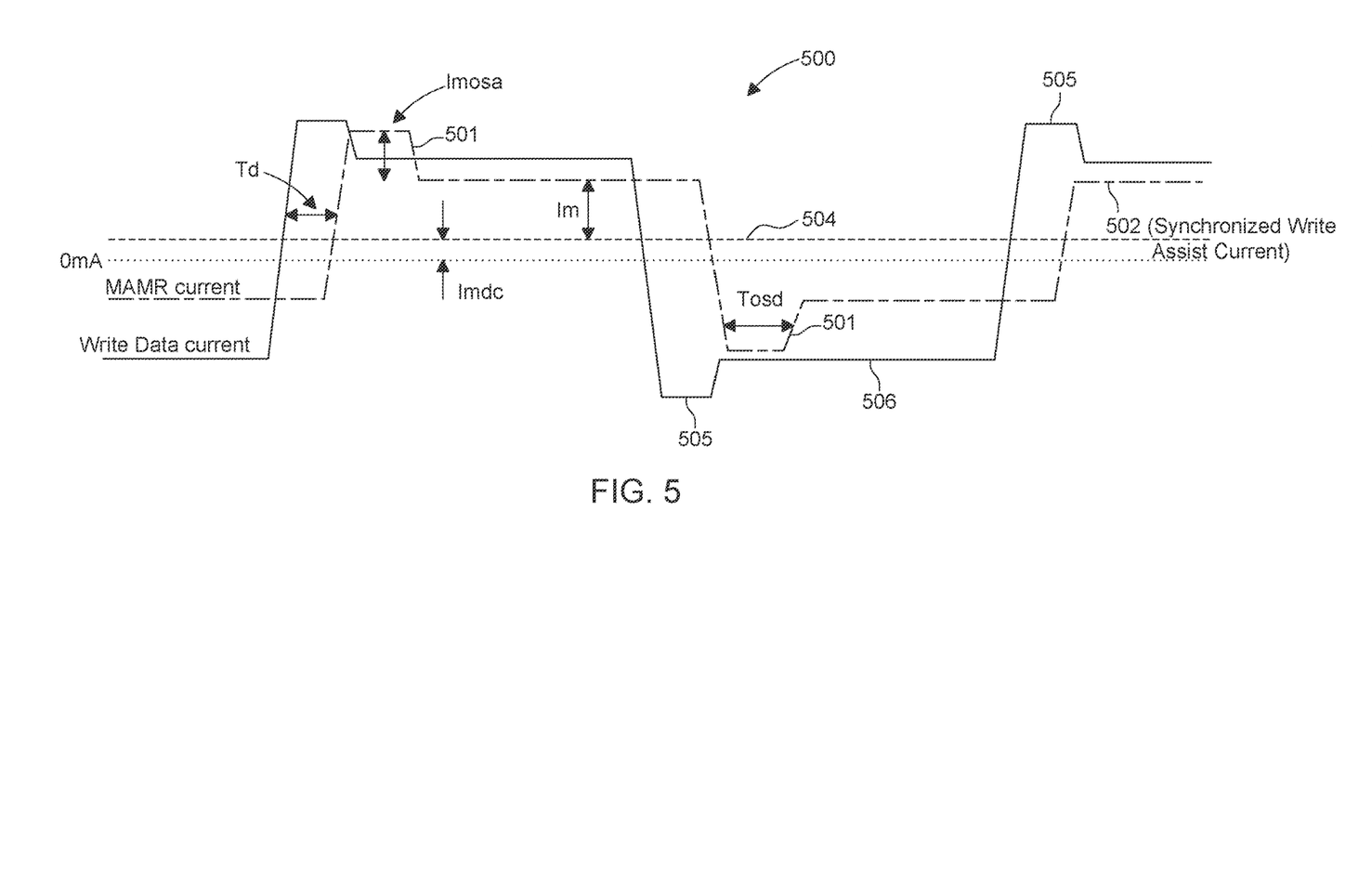
FIG. 5 is a timing diagram showing the synchronized write assist current Im with programmable overshoot pulse Imosa and programmable overshoot duration Tosd, the DC write assist current Imdc, and the write data current Iw, in accordance with aspects of this disclosure.

Preamp 220 further comprises dynamic wave shaping (DWS) element 232, which provides a DWS trigger signal to driver circuit 222. DWS element 232 can optionally modify parameters of the synchronized write assist current Im based on the shape and pattern of the write data current Iw. For example, and as will be described in more detail herein, DWS element 232 can provide synchronized write assist current Im with a programmable overshoot pulse (Imosa) and a programmable overshoot duration (Tosd) (FIG. 5). In addition, DWS element 232 can boost the synchronized write assist current Im (FIG. 6A) as well as the overshoot pulse Imosa (FIG. 6B).

Preamp 220 is coupled to data channel 240. Data channel 240 comprises DWS driver 242, which drives DWS element 232 of preamp 220 with differential signals DWS_p and DWS_n. Data channel 240 further comprises write driver 244, which drives write receiver 230 of preamp 220 with differential write data signals Wrt_p and Wrt_n. Data channel further comprises logic/SIO element 246 which is in communication with logic/SIO element 236 of preamp 220.

Figure 3:
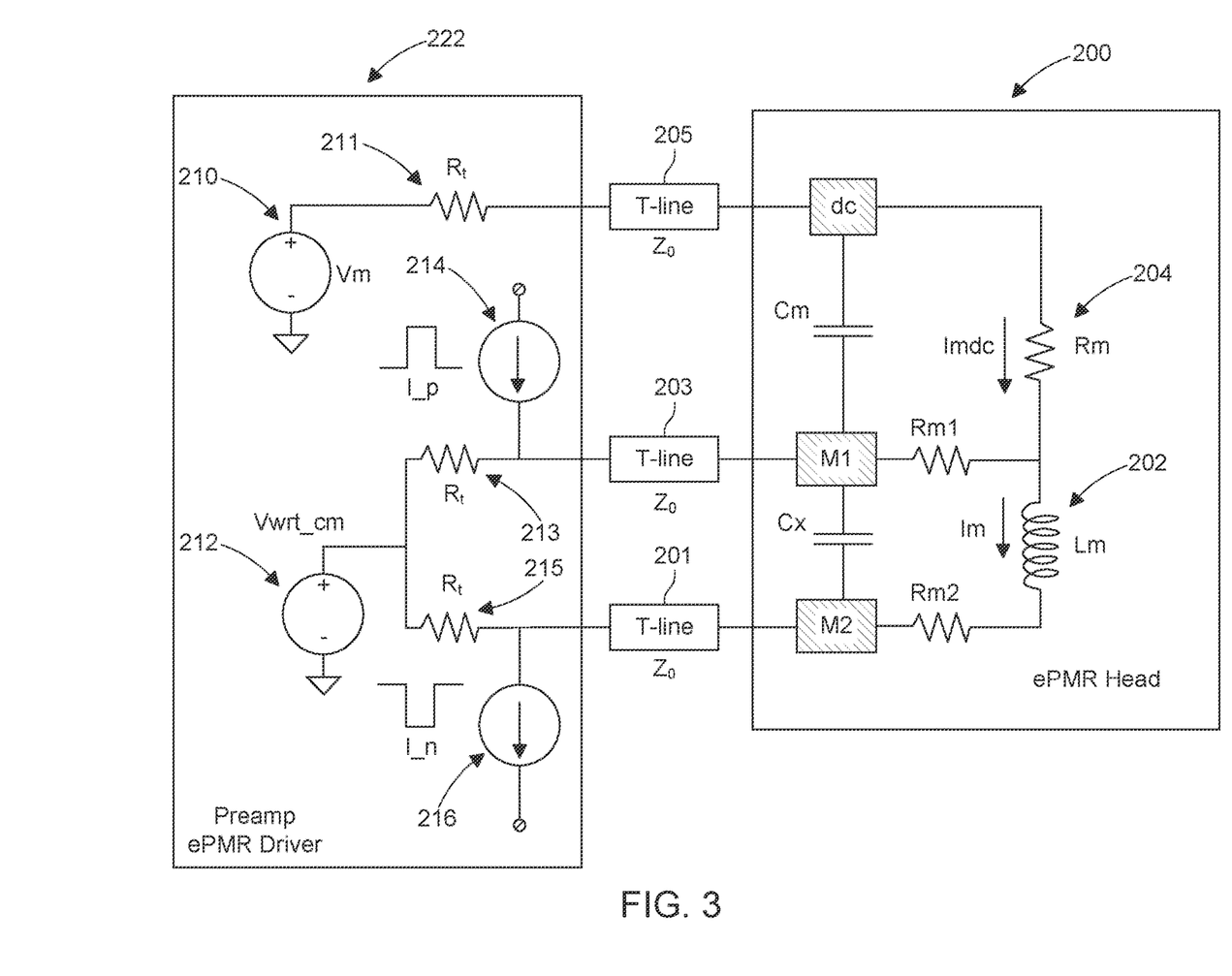
FIG. 3 is a conceptual block diagram of an ePMR head and an ePMR driver circuit for the head, in accordance with aspects of this disclosure.

FIG. 3 is a conceptual block diagram of head 200 and driver circuit 222, in accordance with aspects of this disclosure. Voltage source 210 (Vm) of driver circuit 222, which is coupled to the DC terminal of head 200 via termination resistance 211 (Rt) and transmission line 205, programmably sets the DC write assist current Imdc applied to ePMR write assist element 204 (Rm) relative to the common mode voltage source 212 (Vwrt_cm). Termination resistance 211 (Rt) is matched with the impedance Zo of transmission line 205 to minimize voltage reflections. Common mode voltage source 212 (Vwrt_cm) is coupled to transmission lines 203 and 201 via termination resistances 213 and 215 (Rt), which are matched with the impedances of transmission lines 203 and 201 to minimize voltage reflections.

Current sources 214 and 216 of driver circuit 222 respectively generate pulsed or toggled currents I_p and I_n that are timed relative to the write data current Iw via application of the write data current Iw to driver circuit 222 (FIG. 2). Pulsed or toggled currents I_p and I_n are coupled, respectively, to terminals M1 and M2 of head 200 via transmission lines 203 and 201 to produce a write assist current Im that is synchronized with the write data current Iw and that flows through FEePMR write assist element 202 (Lm). Thus, driver circuit 222 sets a programmable DC write assist current Imdc through write assist element 204 (Rm) and a programmable synchronized write assist current Im through write assist element 202 (Lm).

In head 200, the capacitance Cm across Rm (across the DC and M1 terminals) should be minimized to minimize current glitches through write assist element 204 (Rm). In addition, the capacitance Cx across FEePMR write assist element 202 (i.e., the capacitance across terminals M1 and M2) can be set to a desirable rise/fall time Tmr (see FIGS. 4A-4B) of the synchronized write assist current Im. Resistance Rm1 between terminal M1 and write assist element 202, and resistance Rm2 between terminal M2 and write assist element 202, are head wiring resistances that should be minimized.

Figure 4A:
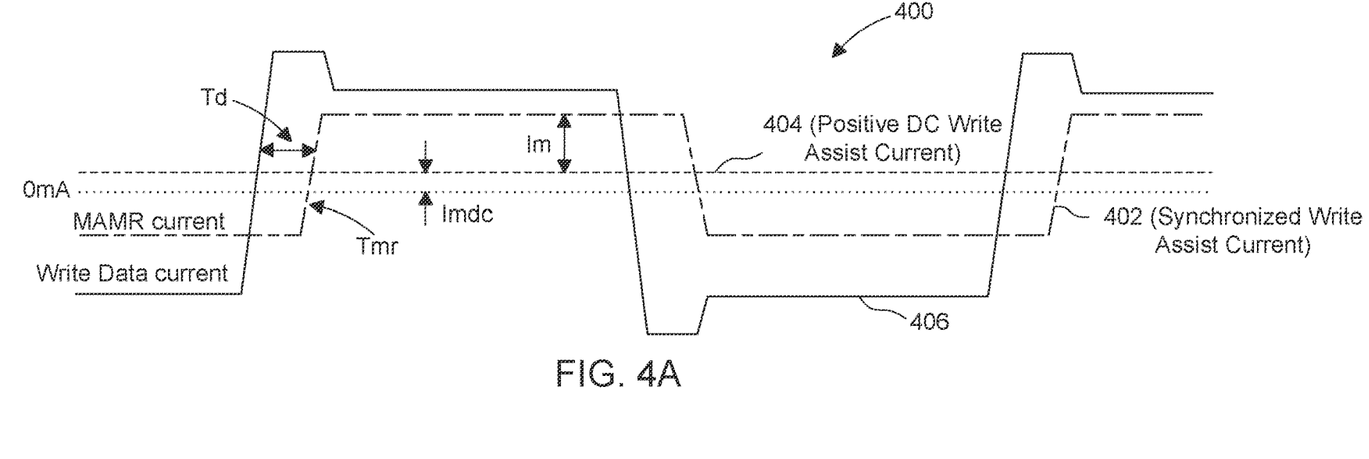
FIG. 4A is a timing diagram showing the synchronized write assist current Im, the DC write assist current Imdc (positive), and the write data current Iw, in accordance with aspects of this disclosure.
Figure 4B:
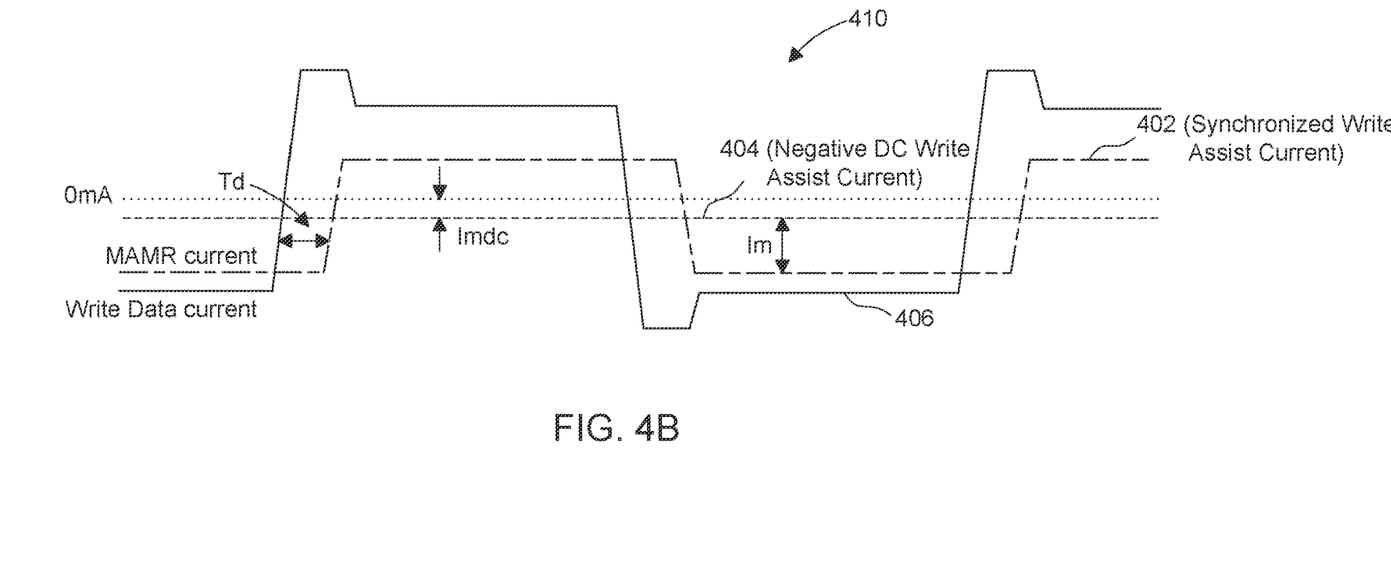
FIG. 4B is a timing diagram showing the synchronized write assist current Im, the DC write assist current Imdc (negative), and the write data current Iw, in accordance with aspects of this disclosure.

FIG. 4A is a timing diagram 400 showing the synchronized (ePMR) write assist current Im at 402, the DC write assist current Imdc at 404, and the write data current Iw at 406, in accordance with aspects of this disclosure. Timing diagram 400 illustrates some of the programmable parameters of the synchronized write assist current 402 and the DC write assist current 404.

In one aspect, the amplitude and polarity of synchronized write assist current 402 Im are programmable. In particular, the amplitude and polarity may be programmed via the pulsed or toggled current sources 214 (I_p) and 216 (I_n). In one aspect, these parameters may be set to track or mimic the amplitude and polarity of the write current Iw (406).

In another aspect, the amplitude and polarity of DC write assist current 404 Imdc are programmable. In particular, the amplitude and polarity may be programmed by voltage source 210 (Vm) of driver circuit 222 relative to common mode voltage source 212 (Vwrt_cm). In this regard, DC write assist current 404 may be set to have a positive polarity, as is shown in FIG. 4A, or may be set to have a negative polarity, as is shown in timing diagram 410 of FIG. 4B.

In another aspect, the delay Td of synchronized write assist current 402 relative to the write data current 406 is programmable. In particular, the delay Td is set by programmable delay element 226 in preamp 220 (FIG. 2). Delay Td may be set such that synchronized write assist current 402 follows write data current 406 (as shown in FIG. 4A), or such synchronized write assist current 402 precedes write data current 406 (not shown).

In another aspect, the rise/fall time Tmr of synchronized write assist current 402 is programmable. In particular, the rise/fall time Tmr may be programmed by setting the rise/fall time of I_p and I_m current sources 214 and 216 (as shown in FIG. 3). Capacitance Cx across FEePMR write assist element 202 (i.e., capacitance Cx between terminals M1 and M2) can be adjusted for a fixed current rise/fall time.

FIG. 5 is a timing diagram 500 showing synchronized write assist current Im at 502, with programmable overshoot pulse 501 having an amplitude Imosa and overshoot duration Tosd, the DC write assist current Imdc at 504, and the write data current Iw at 506. FIG. 5 illustrates additional programmable features of the Im current 502.

In one aspect, synchronized write assist current 502 can be set to have an overshoot pulse 501 of programmable amplitude Imosa and programmable duration Tosd. Overshoot pulse 501 may mimic the overshoot pulse 505 of write data current 506. The amplitude Imosa and duration Tosd of overshoot pulse 501 are programmed by dynamic wave shaping (DWS) element 232 based on the corresponding pattern in write data current 506 (i.e., overshoot pulse 505 of write data current 506).

Figure 6A:
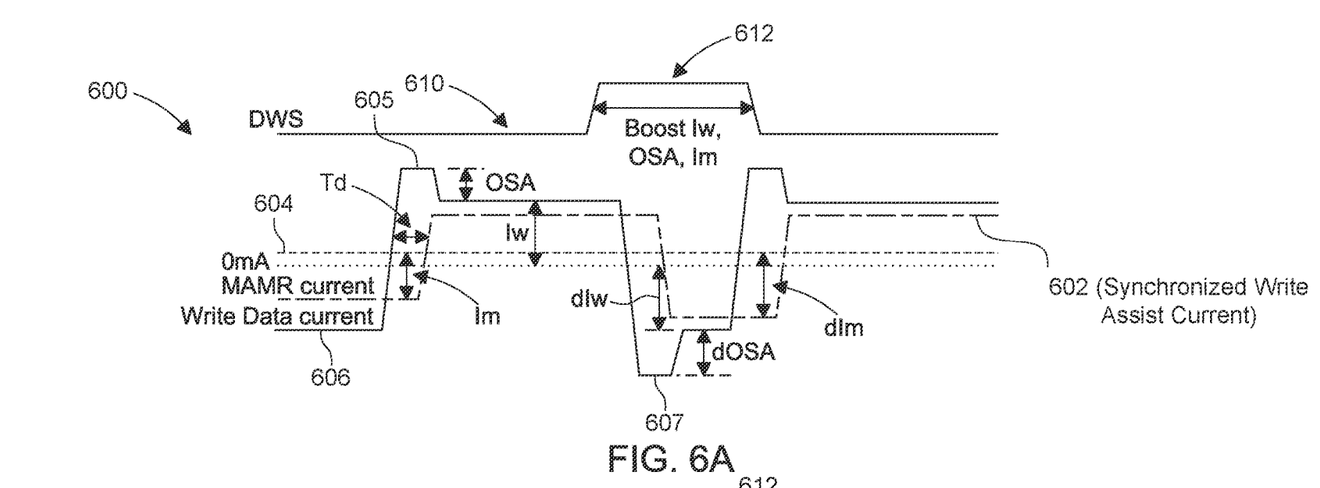
FIG. 6A is a timing diagram showing a boosted synchronized write assist current Im, the DC write assist current Imdc, and the write data current Iw, in accordance with aspects of this disclosure.
Figure 6B:
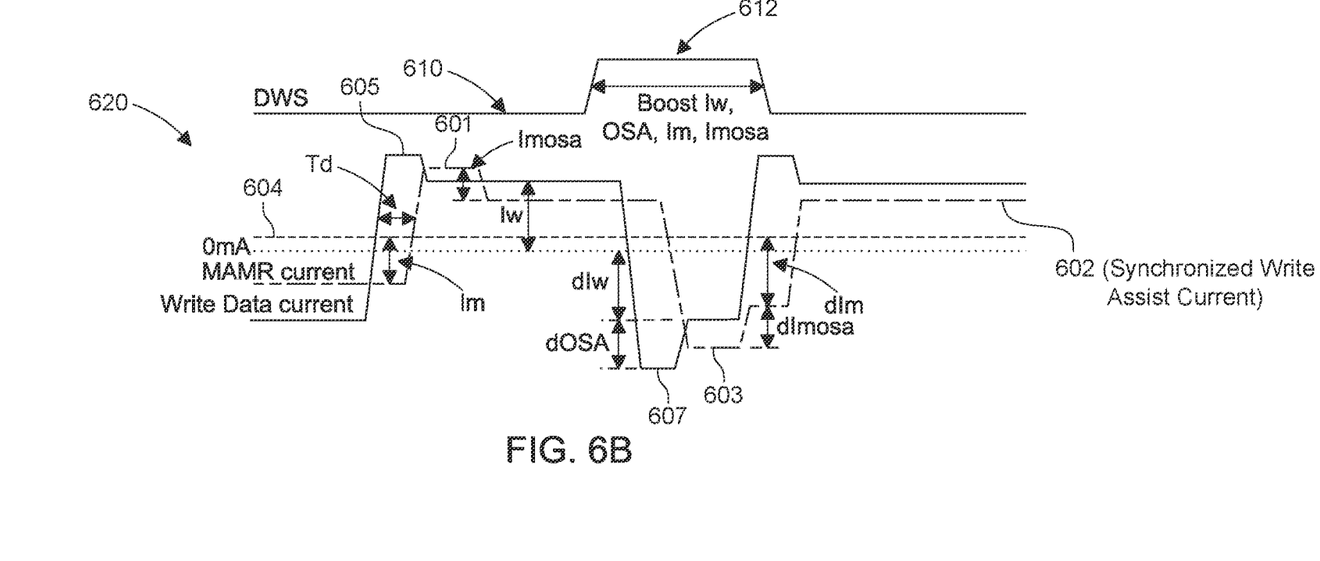
FIG. 6B is a timing diagram showing the boosted synchronized write assist current Im with a boosted overshoot pulse Imosa, the DC write assist current Imdc, and the write data current Iw, in accordance with aspects of this disclosure.

FIG. 6A is a timing diagram 600 showing the synchronized write assist current Im at 602, the DC write assist current Imdc at 604, and the write data current Iw at 606. FIG. 6A also shows DWS signal 610 (i.e., the signal output by DWS element 232) having a boost portion 612. FIG. 6A illustrates additional programmable features of synchronized write assist current 602 and write data current 606.

In one aspect, the amplitude Iw of write data current 606 can be boosted by DWS signal 610. As can be seen in FIG. 6A, during boost portion 612 of DWS signal 610, the amplitude of write data current 606 is boosted from an amplitude of Iw to an amplitude of dIw.

In another aspect, the amplitude OSA of the overshoot pulse 605 of write data current 606 can be boosted by DWS signal 610. As can be seen in FIG. 6A, during boost portion 612 of DWS signal 610, the amplitude OSA of the overshoot pulse 605 is boosted to produce an overshoot pulse 607 having a boosted amplitude dOSA.

In another aspect, the amplitude Im of synchronized write assist current 602 can be boosted by DWS signal 610. As can be seen in FIG. 6A, during boost portion 612 of DWS signal 610, the amplitude of synchronized write assist current 602 is boosted from an amplitude Im to an amplitude dim.

FIG. 6B is a timing diagram 620 showing the synchronized write assist current Im at 602, the DC write assist current Imdc at 604, and the write data current Iw at 606. FIG. 6B further illustrates that the DWS signal 610 (i.e., the signal output by DWS element 232) has a boost portion 612. FIG. 6B illustrates additional programmable features of synchronized write assist current 602.

In one aspect, when synchronized write assist current 602 is programmed to have an overshoot pulse 601 of amplitude Imosa, during boost portion 612 of DWS signal 610, the amplitude Imosa of overshoot pulse 601 is boosted to produce an overshoot pulse 603 have a boosted amplitude dImosa. This is in addition to the boosted amplitude dim also provided to synchronized write assist current 602 during boost portion 612 of DWS signal 610.

Figure 7:
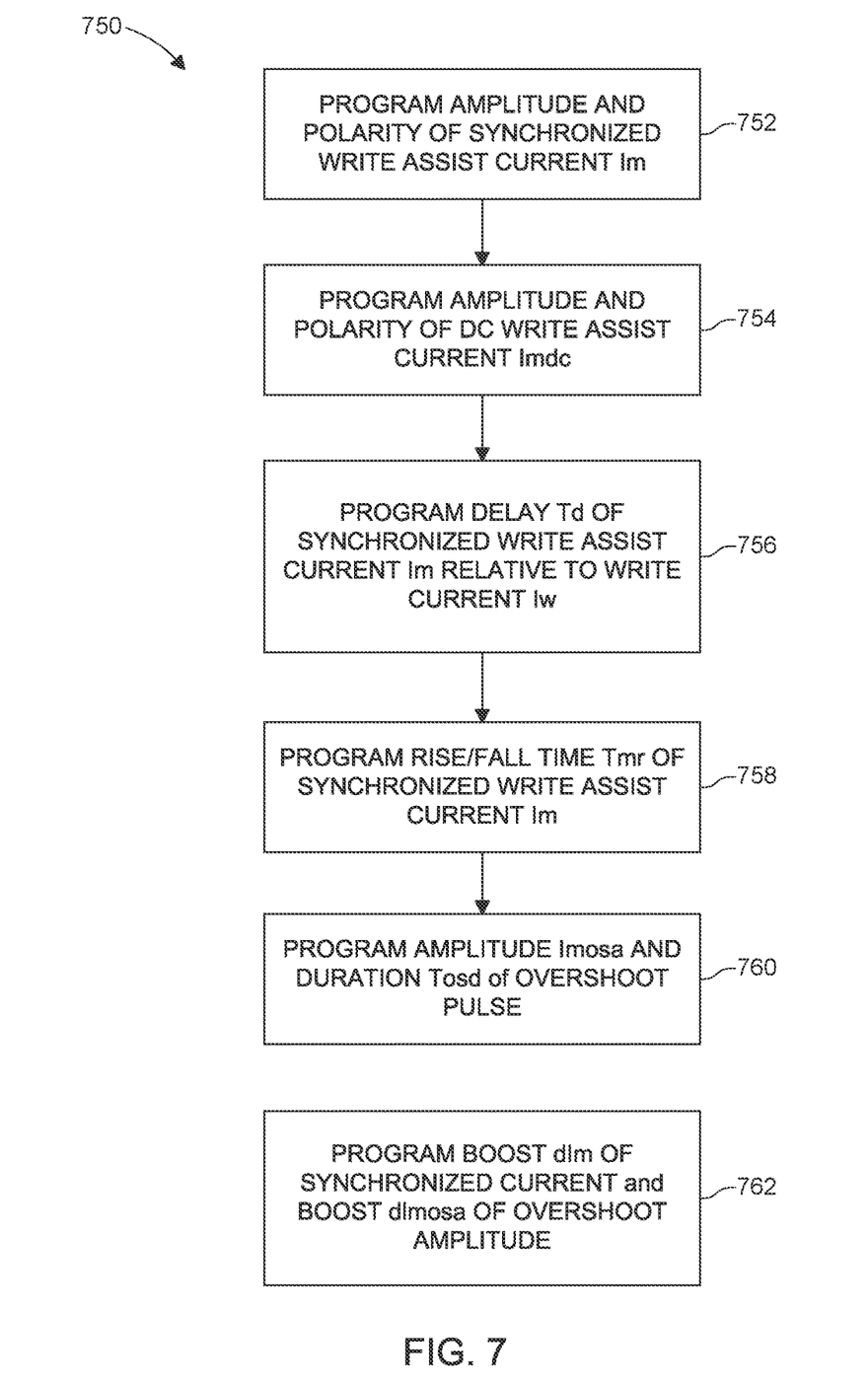
FIG. 7 is a flowchart of a method that the control circuitry of the HDD of FIG. 1A may execute, for programming various parameters of the synchronized and DC write assist currents, in accordance with aspects of this disclosure

FIG. 7 is a flowchart of a method 750 for programming various parameters of the synchronized and DC write assist currents, as discussed with reference to the timing diagrams of FIGS. 4A-6B, in accordance with aspects of this disclosure. In step 752, the amplitude Im and polarity of the synchronized write assist current Im are programmed. Step 752 may be carried out, for example, based on signals received from DWS element 232. In step 754, the amplitude and polarity of the DC write assist current Imdc are programmed. Step 754 may be implemented, for example, by programming voltage source 210 (Vm). In step 756, the delay Td of the synchronized write assist current Im relative to the write data current Iw is programmed. This may be implemented, for example, by programmable delay element 226 (FIG. 2). In step 758, the rise/fall time Tmr of the synchronized write assist current Im is programmed. This may be implemented, for example, by the setting of capacitor Cx across the FEePMR write assist element 202. In step 760, the amplitude Imosa and duration Tosd of the overshoot pulse for synchronized write assist current Im is programmed. Step 760 may be carried out, for example, based on signals received from DWS element 232. In step 762, the amplitude of the synchronized write assist current may be boosted by an amount dim, and the amplitude of the overshoot pulse may be boosted by an amount dImosa. Step 762 may be carried out, for example, based on signals received from DWS element 232.

Figure 8:
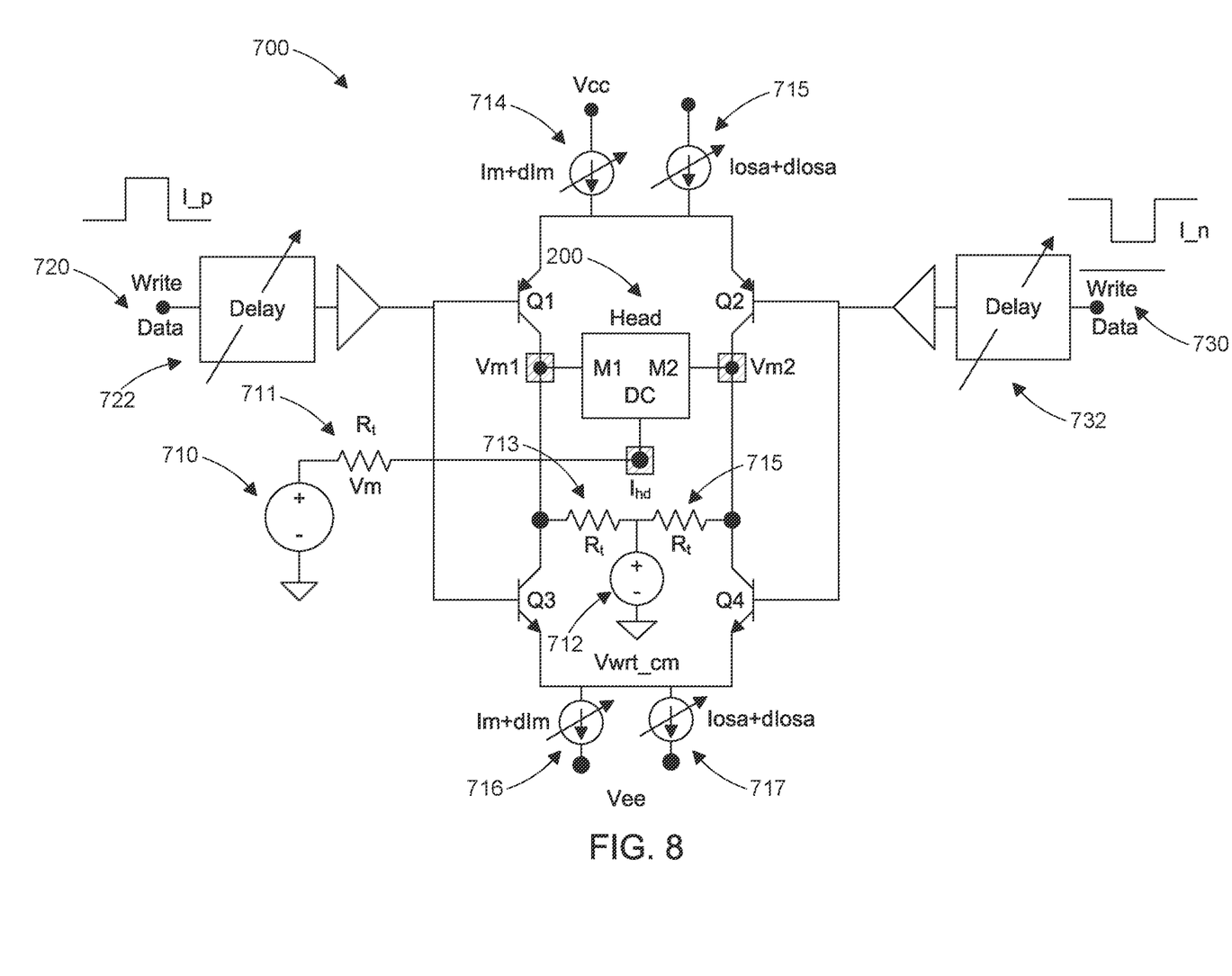
FIG. 8 is a circuit diagram showing additional details of the three terminal ePMR driver circuit of FIG. 3, in accordance with aspects of this disclosure.

FIG. 8 is a circuit driver diagram 700 showing additional details of one possible implementation of driver circuit of FIG. 3, in accordance with aspects of this disclosure. Driver circuit 700 implements a classical H-driver bridge using transistor devices Q1, Q2, Q3 and Q4, where devices Q1-Q4 may be any state-of-the-art transistor device technology that meets speed requirements. Current flows through devices Q1 and Q4 when Q2 and Q3 are off, and vice-versa when the write data current Iw switches polarity. Terminal M1 of head 200 is coupled to the emitter of transistor Q1 and the collector of transistor Q3, and terminal M2 is coupled to the emitter of transistor Q2 and the collector of transistor Q4.

Voltage source 710 (Vm), which is coupled to the DC terminal of head 200 via termination resistance 711 (Rt), programmably sets the DC write assist current Imdc applied to the ePMR write assist element 204 (Rm) of head 200 relative to the common mode voltage source 712 (Vwrt_cm), which is coupled via termination resistances 713 and 715 (Rt) to terminals M1 and M2 of head 200. As in FIG. 3, termination resistances 711, 713 and 715 may be matched with the impedances of their transmission lines to the head terminals to minimize voltage reflections.

Current sources 714 (Im+dIm) and 715 (Iosa+dIosa) are coupled to the emitters of transistors Q1 and Q2, and together produce the positive current I_p (i.e., corresponding to current source 214 of driver circuit 222 of FIG. 3), which is toggled or pulsed with the negative current I_n (i.e., corresponding to current source 216 of driver circuit 222) produced by current sources 716 (Im+dIm) and 717 (Iosa+dIsoa), which are coupled to the emitters of transistors Q3 and Q4, to generate the synchronized write assist current Im that flows through FEePMR write assist element 202 of head 200. Thus, the amplitude Im of the synchronized write assist current can be programmed and boosted by dim, and the amplitude OSA of the overshoot pulse can be programmed and boosted by dIosa. As previously described, the duration (Tosd) of the overshoot pulse can also be programmed. Whether and how much to program and boost the Im current and the overshoot pulse are based on decisions made by the DWS element 232.

The write data current Iw is also provided to driver circuit 700 such that the synchronized write assist current Im can be synchronized or patterned after the write data current Iw. In particular, the positive Iw write data signal 720 is input to the bases of transistors Q1 and Q3 via programmable delay 722, and the negative Iw write data signal 730 is input to the bases of transistors Q2 and Q4 via programmable delay 732. The variable delays 722 and 732 synchronize the write assist current Im with the write coil current Iw as programmed by the delays.

Figure 9A:
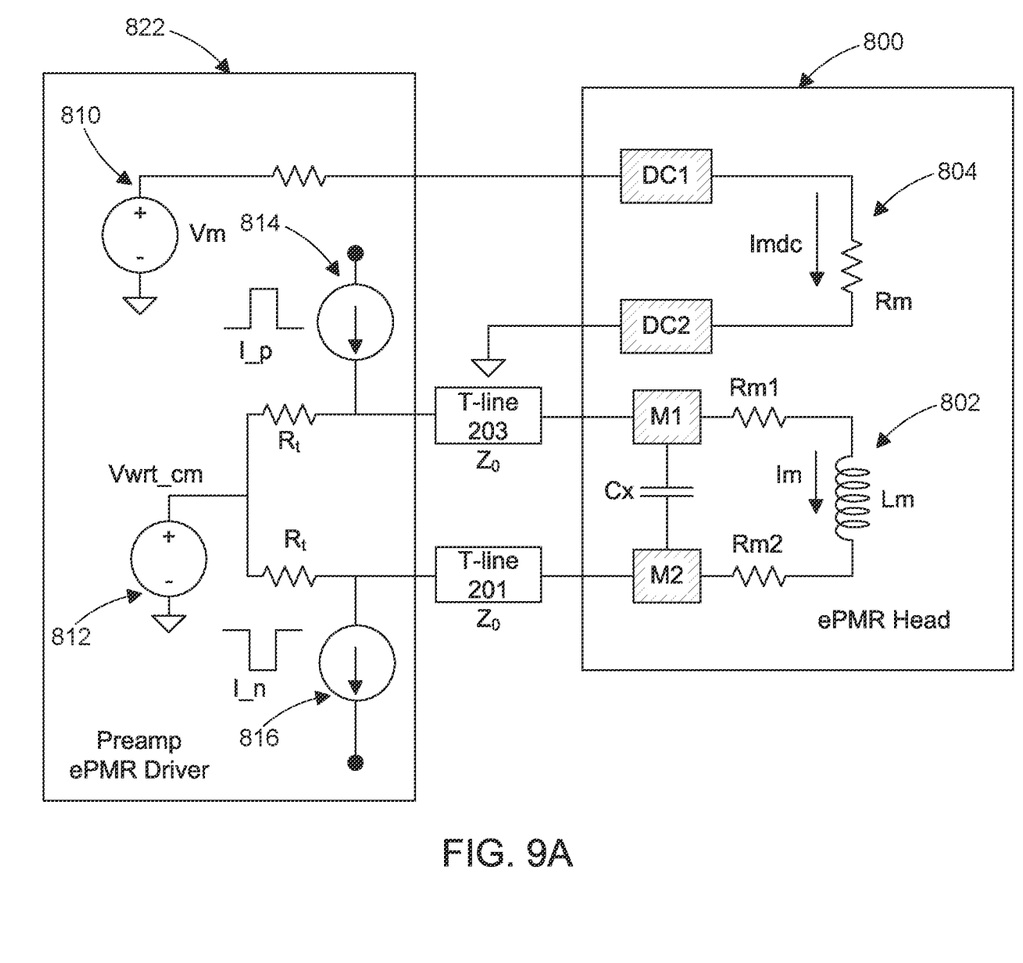
FIG. 9A is a conceptual block diagram of a four terminal ePMR head and an ePMR driver circuit for the head, in accordance with aspects of this disclosure.

In some aspects, it may be desirable to separate the DC write assist current from the synchronized write assist current. FIG. 9A illustrates a modified driver and head configuration for separating the DC write assist current from the synchronized write assist current. Another terminal is added to support the assist element portion of head 800, such that head 800 how has four terminals for its assist elements: DC1, DC2, M1 and M2. Voltage source 810 (Vm) of driver 822, which is coupled to the DC1 terminal of head 800 via a termination resistance, programmably sets the DC write assist current Imdc applied to ePMR write assist element 804 (Rm) relative to the common mode voltage source 812 (Vwrt_cm). The DC2 terminal is added to head 800 and is grounded near either head 800 or driver 822. In this configuration, a matched transmission line is not required between the termination resistance of voltage source 810 and the DC1 terminal. By this configuration, the capacitance Cm across the DC terminal and the M1 terminal (see FIG. 3) is eliminated since those terminals are now electrically separate.

In all other respects, the configurations of head 800 and driver 822 correspond to head 200 and driver circuit 222 of FIG. 2. That is, current sources 814 and 816 respectively generate pulsed or toggled currents I_p and I_n that are timed with the write data current Iw via application of the write data current to the driver (FIG. 2). Pulsed or toggled currents I_p and I_n are coupled, respectively, to terminals M1 and M2 of head 800 via transmission lines 203 and 201 to produce a write assist current Im that is synchronized with the write data current Iw and that flows through FEePMR write assist element 802 (Lm). As in head 200, the capacitance Cx across write assist element 802 can be set to a desirable rise/fall time Tmr (see FIGS. 4A-4B) of the synchronized write assist current Im. Current sources I_p (814) and I_n (816) can be programmed for a desirable rise/fall time Tmr (see FIGS. 4A-4B).

Figure 9B:
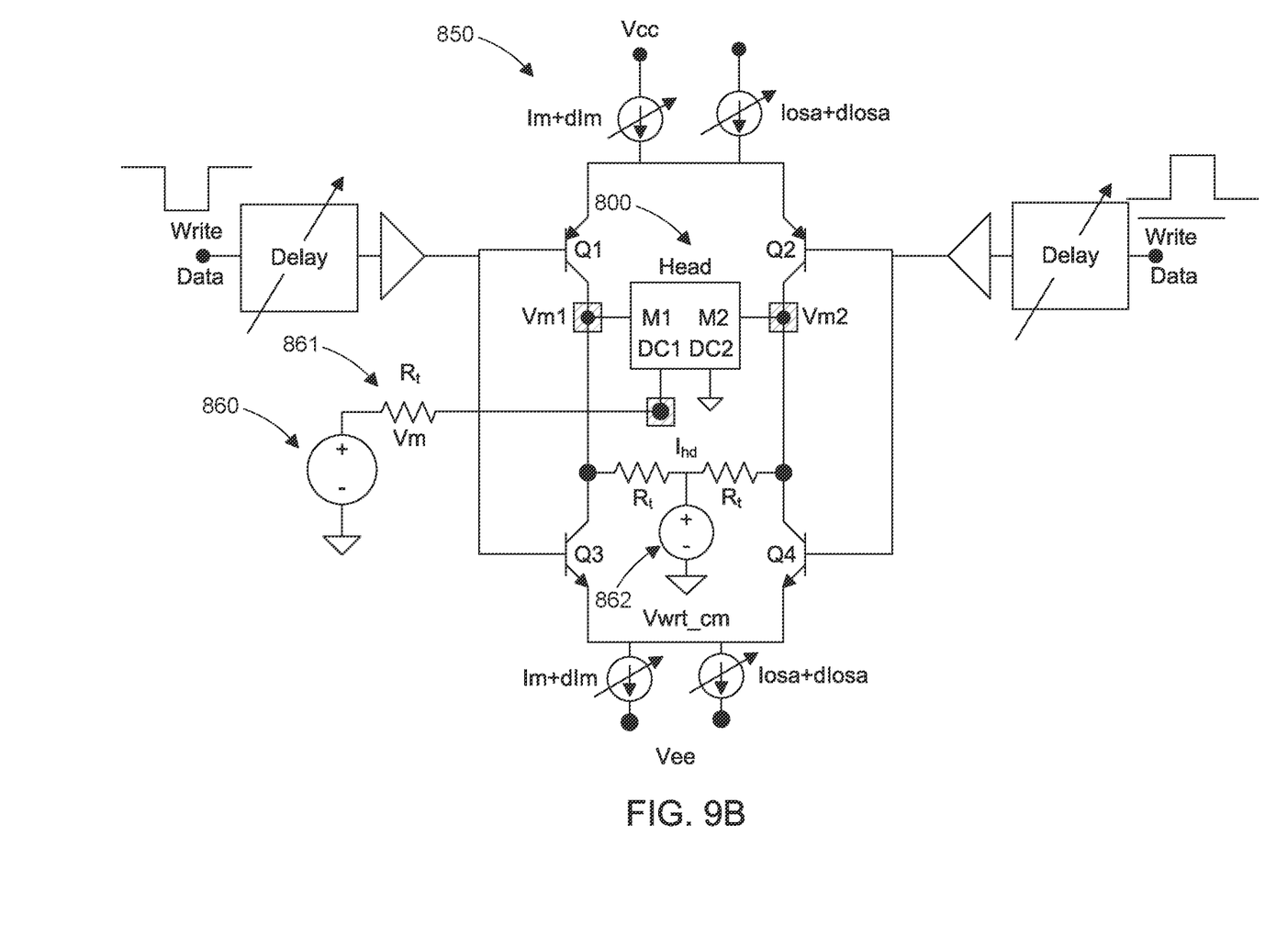
FIG. 9B is a circuit diagram showing additional details of the four terminal ePMR driver circuit of FIG. 8A, in accordance with aspects of this disclosure.

FIG. 9B is a circuit driver diagram 850 showing additional details of one possible implementation of the four terminal assist element driver circuit of FIG. 8A, in accordance with aspects of this disclosure. As with driver circuit 700 of FIG. 7, driver 850 implements a classical H-driver bridge using transistor devices Q1, Q2, Q3 and Q4. Current flows through devices Q1 and Q4 when Q2 and Q3 are off, and vice-versa when the write data current Iw switches polarity. Voltage source 860 (Vm) is coupled to the DC1 terminal of head 800 via termination resistance 861 (Rt) and programmably sets the DC write assist current Imdc applied to write assist element 204 (Rm) of head 200 relative to the common mode voltage source 862 (Vwrt_cm), which is coupled via termination resistances Rt to terminals M1 and M2 of head 200. The DC2 terminal is added to head 800 and is grounded near either head 800 or the driver circuit. In this configuration, a matched transmission line is not required between the termination resistance of voltage source 860 and the DC1 terminal. In all other respects, the circuit driver of FIG. 8B functions in the same manner as that of FIG. 7.

Any suitable control circuitry may be employed to implement the methods (e.g., methods 80 and 750) described herein, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one example, the read channel and data storage controller are implemented as separate integrated circuits, and in another example, they are fabricated into a single integrated circuit or system on a chip (SoC). The control circuitry may also include a preamp circuit implemented as a separate integrated circuit, integrated into the read channel or data storage controller circuit, or integrated into an SoC.

The control circuitry (e.g., control circuitry 10 in FIG. 1A) may comprise a microprocessor executing instructions operable to cause the microprocessor to perform the methods described herein. The instructions may be stored in any computer-readable medium. The instructions may be stored on a non-volatile semiconductor memory device, component, or system external to the microprocessor, or integrated with the microprocessor in an SoC. The instructions may be stored on a disk and read into a volatile semiconductor memory when the disk drive is powered on. The control circuitry may comprise suitable logic circuitry, such as state machine circuitry. The methods, such as, but not limited to, method 80, described herein may be implemented using analog circuitry (e.g., analog comparators, timers, etc.), digital circuitry and/or a combination of analog and digital circuitry.

One or more processing devices may comprise the control circuitry 10 described herein and may perform one or more of the functions of the control circuitry 10 described herein.

The control circuitry 10 may be abstracted away from being physically proximate to the disks and disk surfaces. The control circuitry 10 may be part of (or proximate to) a rack of or a unitary product comprising multiple data storage devices or may be part of (or proximate to) one or more physical or virtual servers or may be part of (or proximate to) to one or more local area or storage area networks or may be part of (or proximate to) a data center or may be hosted in one or more cloud services.

A disk drive or HDD as described herein may include a magnetic disk drive, an optical disk drive, a hybrid disk drive, or other types of disk drive. In addition, electronic devices such as computing devices, data server devices, media content storage devices, or other devices, components, or systems may comprise the storage media and/or control circuitry described herein.

The features and methods described herein may be used independently of one another or may be combined in various ways. All possible combinations and sub-combinations are intended to fall within the scope of this disclosure. Certain method, event, or process blocks may be omitted in some implementations. The methods described herein are not limited to any particular sequence, and the blocks or states relating thereto can be performed in other sequences. The systems and components described herein may be configured differently than described. Elements may be added to, removed from, or rearranged relative to this disclosure.

While this disclosure has been described with reference to various examples and particular implementations, these examples are illustrative, and the scope of this disclosure is not limited to them. Many variations, modifications, and additions are possible and are within the scope of this disclosure. Such variations, modifications and additions fall within the scope of the disclosure as defined in the claims that follow.

What is claimed is:

1. A data storage device comprising:
    a storage medium;
    a head configured to write data to the storage medium, the head comprising a first write assist element, a second write assist element, and a write pole; and
    control circuitry for driving the head, the control circuitry comprising one or more processing devices that are configured, individually or in combination, to:
        apply a write data current (Iw) to the write pole;
        apply, to the first write assist element, a first write assist current (Im) that is synchronized to the write data current (Iw); and
        apply a second write direct current (DC) assist current (Imdc) to the second write assist element.

2. The data storage device of claim 1, wherein:
    the first write assist element is a field effect energy assisted perpendicular magnetic recording (FEePMR) write assist element that enhances a write field generated by the write pole.

3. The data storage device of claim 2, wherein the second write assist element is an energy assisted perpendicular magnetic recording (ePMR) write assist element, and wherein, when at least one of the first and second write assist currents is applied to a respective one of the first and the second write assist element, a magnetic field applied to the storage medium increases resulting in one or more of (1) an increase in aerial density of the storage medium, and (2) a reduction in jitter.

4. The data storage device of claim 3, wherein the control circuitry further comprises:
    a first voltage source (Vm) that is coupled to the second write assist element to generate the second DC write assist current (Imdc).

5. The data storage device of claim 1, wherein the control circuitry further comprises:
    a first current source and a second current source that respectively generate first and second toggled currents I_p and I_n, wherein the first and second toggled currents are timed relative to the write data current (Iw), and wherein the first and second current sources are coupled to the first write assist element to generate the first write assist current (Im).

6. The data storage device of claim 1, wherein the control circuitry further comprises a dynamic wave shaping (DWS) element for programming an overshoot pulse amplitude and an overshoot pulse duration of the first write assist current (Im).

7. The data storage device of claim 1, wherein the control circuitry further comprises a variable delay element for programming a delay of the first write assist current (Im) relative to the write data current (Iw).

8. The data storage device of claim 1, wherein the control circuitry further comprises a variable capacitance (Cx) across the first write assist element that sets a rise/fall time of the first write assist current (Im).

9. Control circuitry for driving a head of a data storage device, the head comprising an inductive write assist element and a resistive write assist element, the control circuitry comprising:
    means for applying a first write assist current (Im) that is synchronized to a write data current (Iw) to the inductive write assist element; and
    means for applying a second DC write assist current (Imdc) to the resistive write assist element.

10. The control circuitry of claim 9, wherein the means for applying the first write assist current comprises:
    means for generating a first toggled current I_p and a second toggled current I_n using a respective one of a first current source and a second current source, wherein the first and second toggled currents are timed relative to the write data current (Iw), and wherein the first and second current sources are coupled to the first write assist element to generate the first write assist current (Im).

11. The control circuitry of claim 9, wherein the means for applying the second write assist current comprises:
    a voltage source (Vm) that is coupled to the second write assist element to generate the second DC write assist current (Imdc).

12. The control circuitry of claim 9, further comprising a dynamic wave shaping (DWS) element that programs an overshoot pulse amplitude and an overshoot pulse duration of the first write assist current (Im).

13. The control circuitry of claim 9, further comprising a variable delay element that programs a delay of the first write assist current (Im) relative to the write data current (Iw).

14. The control circuitry of claim 9, further comprising a variable rise/fall time across the first write assist element that is programmed to set a rise/fall time of the first write assist current (Im).

15. A method for driving a head of a data storage device, the method comprising:
    applying a synchronized write assist current (Im) to a field effect energy assisted perpendicular magnetic recording (FEePMR) write assist element during a write operation, wherein the synchronized write assist current (Im) is synchronized to a write data current (Iw);
programming an amplitude and a polarity of the synchronized write assist current (Im) to track an amplitude and a polarity of the write data current (Iw); and
applying a DC write assist current (Imdc) to an ePMR write assist element during the write operation.

16. The method of claim 15, further comprising:
setting an amplitude and a polarity of the DC write assist current (Imdc) by programming a voltage source (Vm).

17. The method of claim 15, further comprising:
setting a delay (Td) of the synchronized write assist current (Im) relative to the write data current (Iw) by programming a variable delay element.

18. The method of claim 15, further comprising:
setting a rise/fall time (Tmr) of the synchronized write assist current (Im) by programming a variable rise/fall current across the FEePMR write assist element.

19. The method of claim 15, further comprising:
programming an amplitude (Imosa) and a duration (Tosd) of an overshoot pulse for the synchronized write assist current (Im) based on signals from a dynamic wave shaping (DWS) element of the data storage device.

20. A data storage device comprising:
a storage medium;
a head configured to write data to the storage medium, the head comprising a first write assist element and a write pole; and
control circuitry for driving the head, the control circuitry comprising:
 a first current source for generating a first toggled current I_p;
 a second current source for generating a second toggled current I_n; and
 one or more processing devices that are configured, individually or in combination, to:
  apply a write data current (Iw) to the write pole;
  time the first and second toggled currents relative to the write data current (Iw);
  generate a first write assist current (Im), based on coupling the first and second current sources to the first write assist element; and
  apply, to the first write assist element, the first write assist current (Im) that is synchronized to the write data current (Iw).

21. A data storage device comprising:
a storage medium;
a head configured to write data to the storage medium, the head comprising a first write assist element and a write pole; and
control circuitry for driving the head, the control circuitry comprising a dynamic wave shaping (DWS) element, and one or more processing devices that are configured, individually or in combination, to:
 apply a write data current (Iw) to the write pole;
 apply, to the first write assist element, a first write assist current (Im) that is synchronized to the write data current (Iw); and
 program, using the DWS element, an overshoot pulse amplitude and an overshoot pulse duration of the first write assist current (Im).

22. A data storage device comprising:
a storage medium;
a head configured to write data to the storage medium, the head comprising a first write assist element and a write pole; and
control circuitry for driving the head, the control circuitry comprising a variable delay element, and one or more processing devices that are configured, individually or in combination, to:
 apply a write data current (Iw) to the write pole;
 apply, to the first write assist element, a first write assist current (Im) that is synchronized to the write data current (Iw); and
 program, using the variable delay element, a delay of the first write assist current (Im) relative to the write data current (Iw).

* * * * *